United States Patent
Liu

(10) Patent No.: US 12,335,788 B2
(45) Date of Patent: Jun. 17, 2025

(54) METHOD AND APPARATUS FOR TRANSMITTING DATA, COMMUNICATION DEVICE AND STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 381 days.

(21) Appl. No.: 17/906,734

(22) PCT Filed: Mar. 20, 2020

(86) PCT No.: PCT/CN2020/080473
§ 371 (c)(1),
(2) Date: Sep. 19, 2022

(87) PCT Pub. No.: WO2021/184368
PCT Pub. Date: Sep. 23, 2021

(65) Prior Publication Data
US 2023/0141323 A1 May 11, 2023

(51) Int. Cl.
*H04W 28/22* (2009.01)
*H04W 40/04* (2009.01)

(52) U.S. Cl.
CPC .......... *H04W 28/22* (2013.01); *H04W 40/04* (2013.01)

(58) Field of Classification Search
CPC ..... H04W 80/04; H04W 48/20; H04W 84/12; H04W 36/008375; Y02D 30/70
See application file for complete search history.

(56) References Cited

U.S. PATENT DOCUMENTS

| | | | | |
|---|---|---|---|---|
| 2005/0169209 | A1* | 8/2005 | Miu | H04W 28/0861 370/328 |
| 2010/0177656 | A1* | 7/2010 | Kim | H04W 76/15 370/252 |
| 2013/0272269 | A1* | 10/2013 | Srivastava | H04W 36/08 370/332 |
| 2014/0003263 | A1* | 1/2014 | Sheriff | H04W 84/12 370/252 |
| 2014/0003355 | A1* | 1/2014 | Iyer | H04W 74/08 370/329 |
| 2017/0111842 | A1 | 4/2017 | Manroa et al. | |
| 2018/0234916 | A1* | 8/2018 | Song | H04W 48/18 |
| 2019/0246346 | A1 | 8/2019 | Huang et al. | |
| 2019/0373539 | A1* | 12/2019 | Chen | H04W 48/16 |

(Continued)

FOREIGN PATENT DOCUMENTS

| | | |
|---|---|---|
| CN | 101142790 A | 3/2008 |
| CN | 104768195 A | 7/2015 |
| CN | 106162696 A | 11/2016 |

(Continued)

*Primary Examiner* — Dady Chery
(74) *Attorney, Agent, or Firm* — McCoy Russell LLP

(57) ABSTRACT

A method for transmitting data includes: transmitting data by using a first access point in response to determining that the first access point is in an on-line state; and transmitting data by using a second access point in response to determining that the first access point is in an off-line state. A maximum data transmission rate supported by the second access point is less than that supported by the first access point.

17 Claims, 8 Drawing Sheets

(56) References Cited

U.S. PATENT DOCUMENTS

2020/0059843 A1  2/2020  Tang
2020/0322850 A1  10/2020  Zhu et al.

FOREIGN PATENT DOCUMENTS

| CN | 106792957 A | 5/2017 |
| CN | 107360601 A | 11/2017 |
| CN | 107466073 A | 12/2017 |
| CN | 107846672 A | 3/2018 |
| CN | 109219046 A | 1/2019 |
| CN | 109429287 A | 3/2019 |

* cited by examiner

METHOD AND APPARATUS FOR TRANSMITTING DATA, COMMUNICATION DEVICE AND STORAGE MEDIUM

CROSS REFERENCE TO RELATED APPLICATION

The present application is a U.S. National Phase of International Application No. PCT/CN2020/080473 entitled "METHOD AND APPARATUS FOR TRANSMITTING DATA, COMMUNICATION DEVICE AND STORAGE MEDIUM," and filed on Mar. 20, 2020. The entire contents of the above-listed application are hereby incorporated by reference for all purposes.

BACKGROUND

Commercial Internet of Things (IoT) has several types of system structures, one type of system structure is based on the long range (Lora) technology and has narrower bands. The system structure based on a Lora protocol is suitable for terminals low requirements for data transmission rates, delay and other parameters, but low cost, such as transportation and storage terminals, meter reading terminals and smart city terminals. Another type of system structure is based on the home wireless-fidelity (WiFi) or Bluetooth technology. Using the system structure for communication can make a data transmission rate satisfy requirements and achieve almost free communication, with low-cost and mature device chips.

SUMMARY

According to a first aspect of the examples of the disclosure, there is provided the method for transmitting data. The method includes:
  transmitting data by using a first access point in response to determining that the first access point is in an on-line state; and
  transmitting data by using a second access point in response to determining that the first access point is in an off-line state.
A maximum data transmission rate supported by the second access point is less than that supported by the first access point.

According to a second aspect of the examples of the disclosure, there is further provided a communication device. The communication device includes:
  an antenna;
  a memory; and
  a processor that is connected to the antenna and the memory separately and configured to control the antenna to receive and transmit wireless signals by executing an executable program stored in the memory, and is capable of implementing the steps of the method provided in any one of technical solutions.

According to a third aspect of the examples of the disclosure, there is further provided a non-temporary computer-readable storage medium, which stores an executable program. The executable program implements the steps of the method provided in any one of technical solutions when being executed by a processor.

DETAILED DESCRIPTION

The examples will be described in detail herein and shown in the accompanying drawings illustratively. When the following descriptions relate to the accompanying drawings, unless otherwise specified, the same numeral in different accompanying drawings denotes the same or similar element. The implementations described in the following examples do not denote all implementations consistent with examples of the present disclosure. On the contrary, they are merely examples of an apparatus and a method consistent with some aspects of the examples of the present disclosure as detailed in the appended claims.

The terms used in the examples of the disclosure are merely to describe the specific examples, instead of limiting the examples of the disclosure. The singular forms such as "a" and "the" used in the examples of the disclosure and the appended claims are also intended to include the plural forms, unless otherwise clearly stated in the context. It should also be understood that the term "and/or" used herein refers to and includes any of one or more of the associated listed items or all possible combinations.

It should be understood that although the terms such as first, second and third may be used to describe various information in the examples of the disclosure, the information should not be limited to the terms. The terms are merely used to distinguish the same type of information from other types of information. For example, without departing from the scope of the examples of the disclosure, first information may also be called second information, and similarly, the second information may also be called the first information. Depending on the context, the words "if" and "under the condition" as used herein may be interpreted as "when" or "while" or "in response to determining".

The disclosure relates to, but is not limited to, the technical field of wireless communication, and in particular to a method and an apparatus for transmitting data, a communication device and a storage medium.

Figure 1:
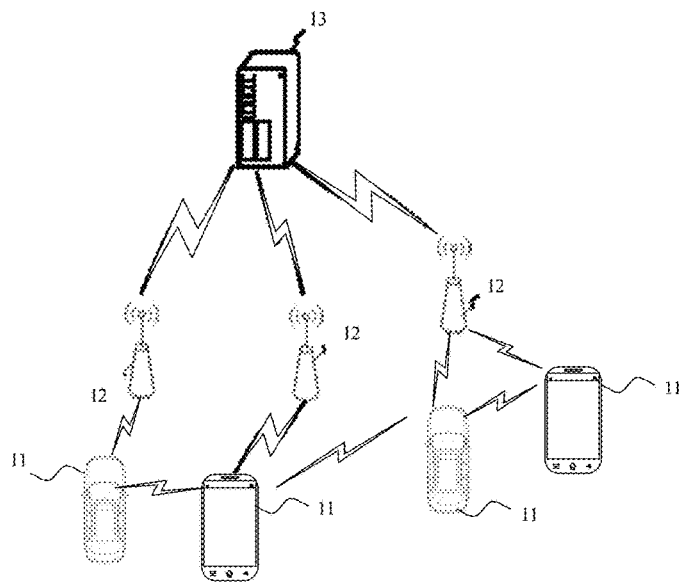
FIG. 1 is a structural schematic diagram of a wireless communication system provided in an example of the disclosure.

FIG. 1 shows a structural schematic diagram of a wireless communication system provided in an example of the disclosure. As shown in FIG. 1, the wireless communication system may include: several terminals 11 and several base stations 12.

The terminal 11 may refer to a device that provides voice and/or data connectivity for a user. The terminal 11 may be an Internet of Things terminal, such as a sensor device, a mobile telephone (also called a cellular telephone) and a computer having an Internet of Things terminal, which may be a fixed, portable, pocket, handheld, built-in or vehicle-mounted apparatus. The terminal may be a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 may further be a device of an unmanned aerial vehicle. Alternatively, the terminal 11 may further be a vehicular device, which may be, for example, a vehicle computer having a wireless communication function, or a wireless communication device connected to the vehicle computer. Alternatively, the terminal 11 may further be a roadside device, which may be, for example, a street lamp having a wireless communication function, a signal lamp, or other roadside devices.

In some examples, an end to end (E2E) connection may be further established between the terminals 11, which may be vehicle to vehicle (V2V) communication, vehicle to infrastructure (V2I) communication, vehicle to pedestrian (V2P) communication, etc. in vehicle to everything (V2X).

In some examples, the wireless communication system may further include a network management device 13.

Several base stations 12 are connected to the network management device 13 separately. The network management device 13 may be a core network device in the wireless communication system. For example, the network management device 13 may be a mobility management entity (MME) in an evolved packet core (EPC). Alternatively, the network management device may further be a serving gateway (SGW), a public data network gateway (PGW), a policy and charging rules function (PCRF), a home subscriber server (HSS) or other core network devices. An implementation form of the network management device 13 is not limited in the examples of the disclosure.

For better understanding of the technical solution described in any one of the examples of the disclosure, an application scenario in a smart home system is illustrated in an example firstly.

Figure 2:
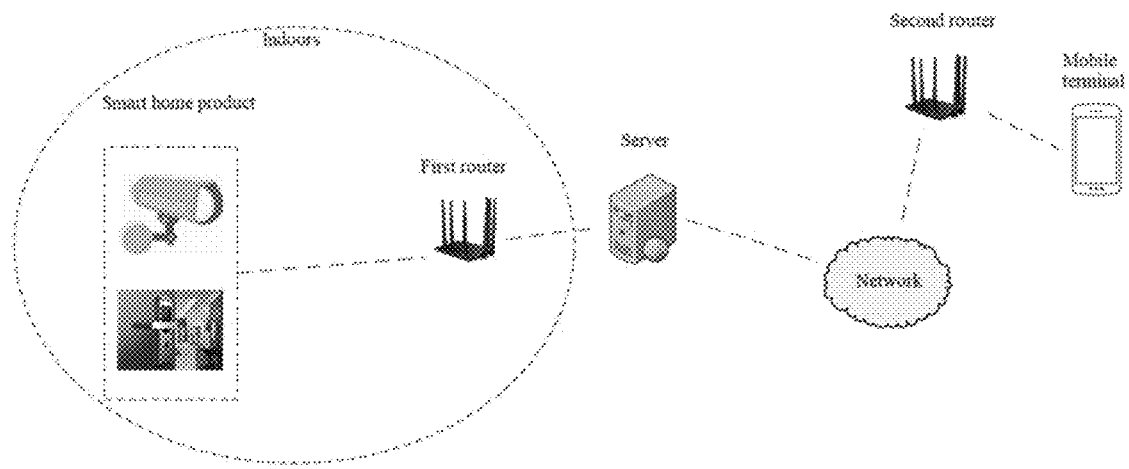
FIG. 2 is a schematic diagram of an application scenario in a smart home provided in an example of the disclosure.

With reference to FIG. 2, the smart home system includes a smart home product, a first router, a server, a network, a second router, a mobile terminal, etc. The smart home product may include a smart camera, a smart door lock, a smart lamp, a smart rice cooker, a sweeping robot or other products that have a communication function and are capable of being remotely controlled. An access point may be a router mounted indoors. During a data interaction between the smart camera and the mobile terminal, the smart camera accesses a network by using the first router, and the mobile terminal accesses the network by using the second router. A network access process is based on the wireless-fidelity (WiFi) technology. On the one hand, after the smart camera obtains image data, the image data is sent to the server by using the first router, such that the server may send the image data to the mobile terminal by using the second router, and the mobile terminal may obtain the image data from the server. On the other hand, when the mobile terminal needs to control the smart camera, a control signal for controlling the smart camera is sent to the server by using the second router, and the server may send the control signal to the smart camera by using the first router, and control a camera by using the control signal. Controlling the camera may be specifically controlling the smart camera to rotate. A packet of the control signal is usually very short. A data transmission rate of the control signal is less than that of image data.

In the example, when a distance between the smart home product and the first router often changes, or the first router fails, or the number of terminals connected to the first router is greater than a maximum load, connection between the smart home product and the first router is unstable, resulting in interruption of mobile terminal control or data transmission, which affects user experiences. In addition, the system has poor security, without any perfect authentication process, which leads to data leakage of the smart home product, potential safety hazards and poor security. Especially for door locks, and monitoring, financial management and other devices and applications having strong security and privacy, security cannot be guaranteed.

Figure 3:
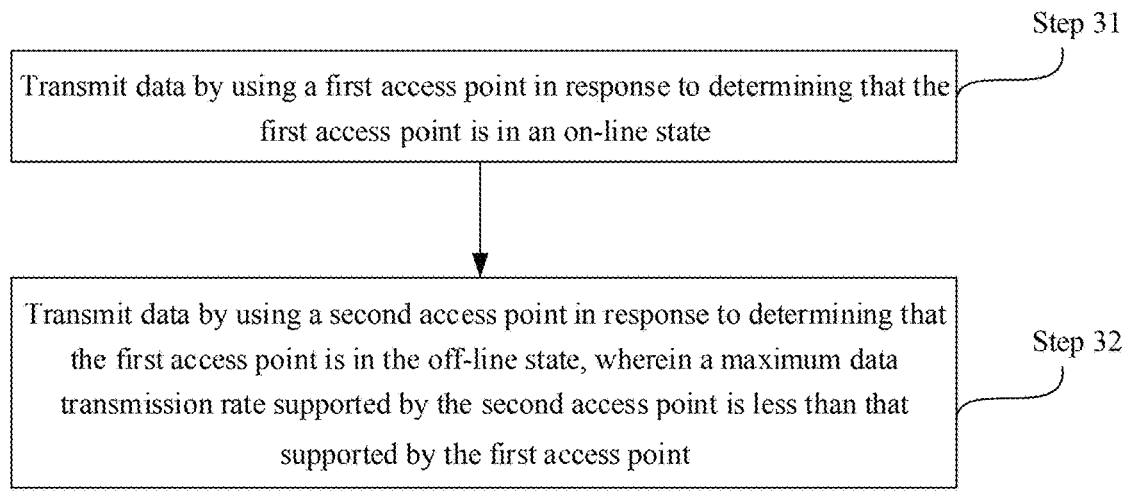
FIG. 3 is a schematic diagram of data transmission provided in an example of the disclosure.

As shown in FIG. 3, an example of the disclosure provides a method for transmitting data. The method includes:

Step 31, data is transmitted by using a first access point in response to determining that the first access point is in an on-line state.

In an example, the first access point may be a wireless router or wireless switch mounted indoors.

In an example, the wireless router achieves wireless communication on the basis of the WiFi technology.

In an example, a first access point may be connected to a plurality of terminals.

In an example, the first access point may be connected to a server having an authentication function.

In an example, the first access point is in the on-line state, which may be a connected state in which a terminal is in wireless communication with the first access point.

In an example, the connected states of the first access point may include the on-line state and an off-line state. For example, after the terminal establishes a wireless connection with the first access point, a corresponding state when data may be sent to the server by using the first access point may be the on-line state. After power of the first access point is turned off or the first access point fails, a corresponding state when the terminal cannot send data to the server by using the first access point may be the off-line state.

In an example, the terminal may transmit data to the server by using the first access point; and the server may also transmit data to the terminal by using the first access point.

In an example, when the terminal enters a signal coverage range of the first access point, the terminal may send an authentication request to a network. After authentication triggered by the authentication request is passed, the terminal is connected to the first access point. In this case, the terminal may transmit data to the network by using the first access point.

Before the terminal is connected to the first access point, an identity of the terminal is authenticated first, such that connection between a terminal with an illegitimate identity and the first access point may be reduced, and network communication may be made safer.

In an example, the first access point may switch from the on-line state to the off-line state at any time, and factors that cause the first access point to switch from the on-line state to the off-line state may be at least one of the following: the number of terminals connected to the first access point exceeds a set number threshold, the first access point has a functional failure, a distance between the first access point and the terminal exceeds a set distance threshold, and the terminal enters a closed area that cannot be covered by signals of the first access point.

In an example, the first access point may transmit data having a data transmission rate greater than a set data transmission rate threshold, such as business data of voices, videos, etc. A transmission delay of the business data of voices, videos, etc. is very short, so a data transmission rate of the business data of voices, videos, etc. is greater than data transmission rates of other types of business data.

In an example, the terminal is a surveillance camera, and the surveillance camera may transmit video data having a data transmission rate greater than the set data transmission rate threshold to the network by using the first access point.

In an example, the first access point may transmit data having a length of a packet less than a set length threshold. With the first access point as a WiFi router and a base station as an example, a set threshold of the WiFi router may be 1024 or more. A set threshold of the base station may be 1518 or more.

In an example, the terminal is a mobile phone, and the mobile phone may transmit a control signal that controls the surveillance camera to rotate and has a data transmission rate less than a set data transmission rate threshold to the network by using the first access point.

In an example, the terminal preferentially uses the first access point to transmit data.

Step 32, data is transmitted by using a second access point in response to determining that the first access point is in the off-line state. A maximum data transmission rate supported by the second access point is less than that supported by the first access point.

In an example, the maximum data transmission rate supported by the second access point is $\frac{1}{10}$, $\frac{1}{100}$, $\frac{1}{1000}$, etc. of that supported by the first access point.

In an example, the second access point may be a base station mounted outdoors.

In the example, an outdoor signal coverage range of the second access point is greater than a set range threshold. For example, a signal coverage range of the second access point may include a geographical coverage range of a certain residential cell.

In an example, the first access point is in the off-line state, which may be a state in which the terminal cannot be in wireless communication with the first access point. In this case, the terminal cannot transmit data to the server by using the first access point; and the server also cannot transmit data to the terminal by using the first access point.

In an example, when the terminal leaves the first access point and moves away from a signal coverage area of the first access point, wireless communication connection between the terminal and the first access point is interrupted, and data can no longer be transmitted to the network by using the first access point. In this case, the first access point is in the off-line state.

In an example, the first access point may also switch from the off-line state to the on-line state at any time, and factors that cause the first access point to switch from the off-line state to the on-line state may be at least one of the following: the number of terminals connected to the first access point is less than the set number threshold, a failure of the first access point is removed, the distance between the first access point and the terminal is less than the set distance threshold, and the terminal enters a good signal coverage area from the closed area that cannot be covered by signals of the first access point.

In an example, the terminal preferentially uses the first access point to transmit data.

In an example, the second access point may transmit data having a data transmission rate less than a set data transmission rate threshold, such as authentication data.

In an example, before the terminal establishes a wireless connection with a wireless network, the authentication data for authenticating the terminal is transmitted by using the second access point. A data transmission rate of the authentication data is less than the set data transmission rate threshold.

In an example, when the terminal enters the signal coverage range of the first access point, the authentication request is sent to the server by using the second access point. After the authentication is passed, the terminal is connected to the first access point. In this case, the terminal may transmit data to the network by using the first access point. Before the terminal is connected to the first access point, the identity of the terminal is authenticated first, such that the connection between the terminal with the illegitimate identity and the first access point may be reduced, and the network communication may be made safer.

In an example, security of the second access point is higher than that of the first access point. Higher security of an access point may be achieved by protecting the access point by using hardware of a higher protection level so as to make data transmitted on the access point not easy to be stolen, or encrypting the data transmitted on the access point through high-level security encryption.

In an example, when the terminal enters the signal coverage range of the second access point, the authentication request is sent to the server by using the second access point. After the authentication is passed, the terminal is connected to the second access point. When the first access point is in the off-line state, the terminal may transmit data to the network by using the second access point. Before the terminal is connected to the second access point, the identity of the terminal is authenticated first, such that connection between the terminal with the illegitimate identity and the second access point may be reduced, and the network communication may be made safer.

Figure 4:
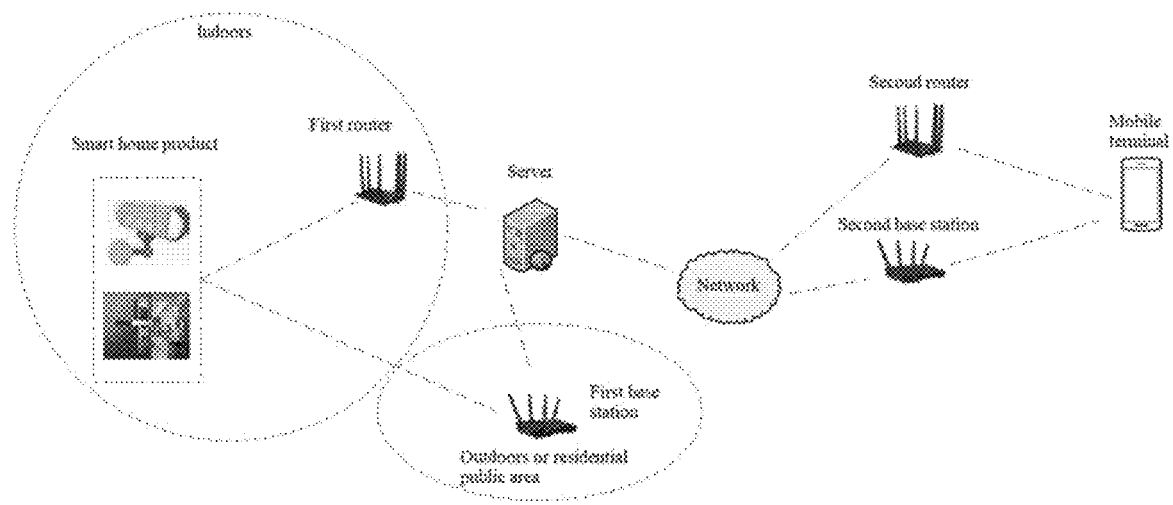
FIG. 4 is a schematic diagram of an application scenario in a smart home provided in another example of the disclosure.

With reference to FIG. 4, in an example, the smart home system includes a smart home product, a first router, a second router, a server, a system network, a first base station, a second base station, a mobile terminal, etc. The smart home product may include a smart camera, a smart door lock, a smart lamp, a smart rice cooker, a sweeping robot or other products that have a communication function and are capable of being remotely controlled. The first router and the second router may correspond to a first access point, and the first base station and the second base station may correspond to a second access point. During a data interaction between a sweeping robot and a mobile terminal, when the sweeping robot establishes a wireless network connection with the first router and the first base station, the sweeping robot may preferentially use the first router to access the network, and then send running data of the sweeping robot to the network in real time by using the first router so as to facilitate inquiry of a user. However, when the sweeping robot leaves a signal coverage area of the first router in a running process, the first router may be in an off-line state, and wireless communication connection between the sweeping robot and the first router may be interrupted. In this case, the sweeping robot may access the network by using the first base station in an on-line state and continue to send running data to the network. Similarly, when the server in the network receives a control signal that is sent from the mobile terminal and controls the sweeping robot to run, if the first router is in the on-line state, the server may preferentially send the control signal to the sweeping robot by using the first router, so as to control the sweeping robot to run. However, when the first router is in the off-line state, the server may send the control signal to the sweeping robot by using the first base station in the on-line state, so as to control the sweeping robot to run. Data transmission rates of the running data and data of the control signal are both less than a set data transmission rate threshold.

In the example of the disclosure, when the first access point is in a connected state, a user transmits data by using the first access point. When the first access point is in the off-line state, the user may further transmit data having a data transmission rate less than a maximum data transmission rate supported by the second access point by using the second access point, such that connection stability of the network is higher, transmission of the data having the data transmission rate less than the maximum data transmission rate supported by the second access point cannot be interrupted due to the fact that the first access point is in the off-line state, and poor experiences brought to the user by communication interruption when the first access point is in the off-line state may be reduced. In addition, when the first access point is in the on-line state, data may be transmitted by preferentially using the first access point, such that a terminal may transmit data at a high data transmission rate, and may transmit data with high data transmission efficiency.

Figure 5:
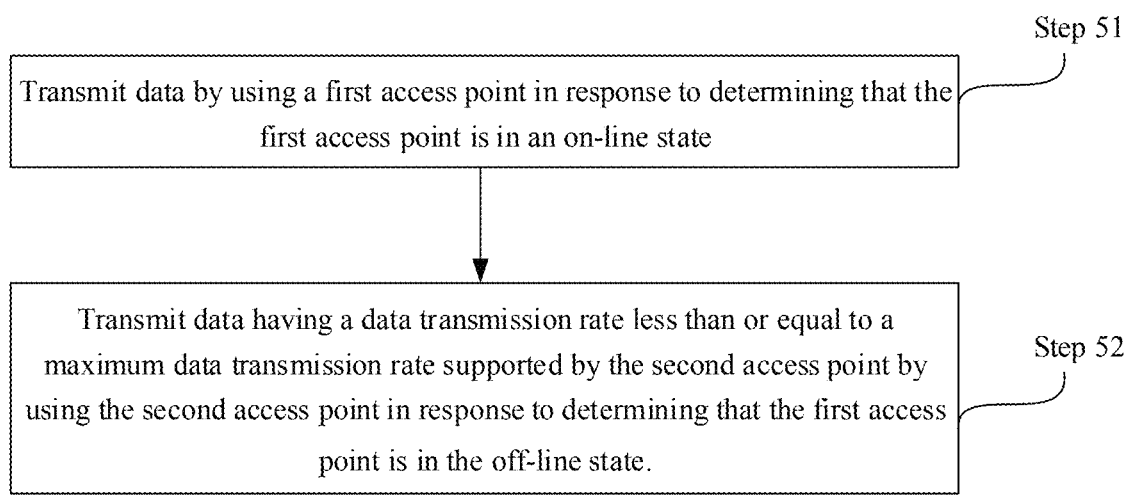
FIG. 5 is a schematic diagram of a method for transmitting data provided in another example of the disclosure.

As shown in FIG. 5, another example of the disclosure provides a method for transmitting data. The method includes:

Step 51, data is transmitted by using a first access point in response to determining that the first access point is in an on-line state.

Step 52, data having a data transmission rate less than or equal to a maximum data transmission rate supported by the second access point is transmitted by using the second access point in response to determining that the first access point is in the off-line state.

The data having the data transmission rate less than or equal to the maximum data transmission rate supported by the second access point may be authentication request data for authentication, authentication feedback data after authentication, or a control signal for controlling a terminal.

In an example, when the second access point is deployed, the supported maximum data transmission rate is set based on service requirements. For example, when a service is an authentication service, the maximum data transmission rate supported by the second access point may be set according to a maximum data transmission rate of data to be transmitted in the authentication service.

In an example, the second access point merely transmits a preset type of service data. A data transmission rate of the preset type of service data is less than or equal to the maximum data transmission rate supported by the second access point. The second access point may detect a service type corresponding to data before transmitting the data. When the service type is a preset type, data of the service type is transmitted.

In an example, the preset type of service data may be authentication data corresponding to an authentication service and control instruction data corresponding to a control service. For example, the control instruction data may be the control signal sent from a mobile terminal to a camera, so as to control the camera to rotate.

Figure 6:
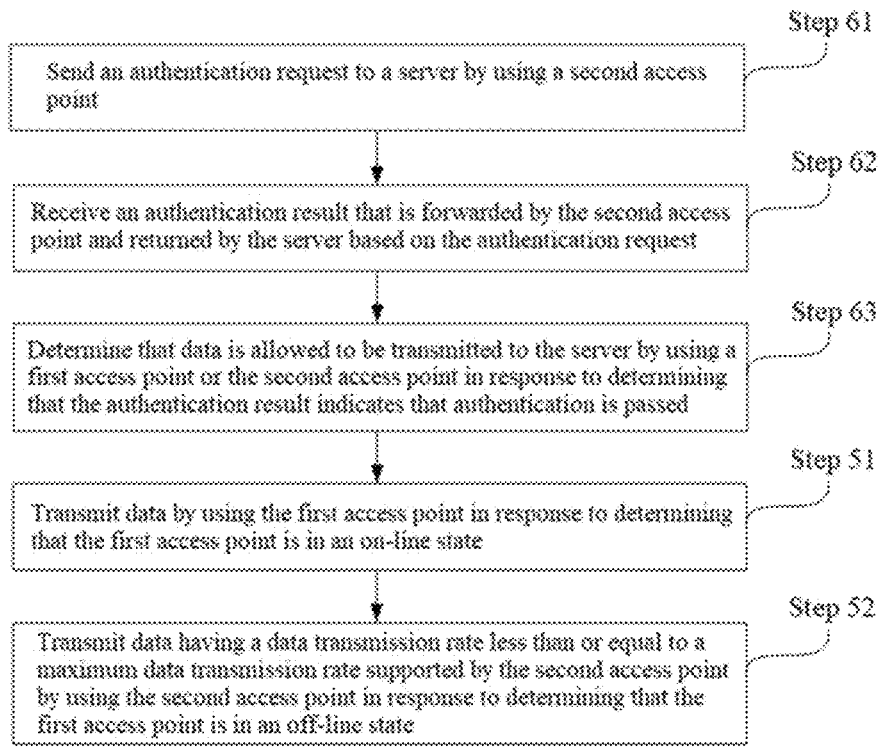
FIG. 6 is a schematic diagram of a method for transmitting data provided in another example of the disclosure.

As shown in FIG. 6, another example of the disclosure provides a method for transmitting data. When the method is used in a terminal, the method further includes:

Step 61, an authentication request is sent to a server by using a second access point.

In an example, when the terminal enters a signal coverage range of the second access point, the authentication request may be sent to the server by using the second access point.

In an example, when the terminal enters a signal coverage range of a first access point, the authentication request may also be sent to the server by using the second access point.

In an example, the authentication request may include authentication information for authenticating an identity of the terminal. The authentication request may be a request to establish a wireless connection with the first access point and/or the second access point.

In an example, the server may have both a terminal authentication function and a data processing function. For example, the server may authenticate the terminal and may forward and process data transmitted from the terminal. For example, in a smart home system, running data sent from a sweeping robot may be stored in the server, and a mobile phone may obtain the running data from the server.

Step 62, an authentication result that is forwarded by the second access point and returned by the server based on the authentication request is received.

Connection security of the second access point is higher than that of the first access point.

In an example, when the server determines that the terminal is a legitimate user device, the authentication result includes information allowing the terminal to access a network by using the first access point and/or the second access point.

In another example, when the server determines that the terminal is an illegitimate user device, the authentication result includes information prohibiting the terminal from accessing the network by using the first access point and the second access point.

In an example, with higher connection security, data transmitted on a connection is unlikely to be stolen, data is transmitted on the basis of a data security level during connection, and the data transmitted on the connection is encrypted through high-order encryption.

Step 63, data is determined to be allowed to be transmitted to the server by using the first access point or the second access point in response to determining that the authentication result indicates that authentication is passed.

In an example, data is determined to be prohibited from being transmitted to the server by using the first access point or the second access point in response to determining that the authentication result indicates that authentication is not passed.

In the example, authentication data having a high security level is transmitted by using the second access point having higher connection security, and common data may be transmitted by using the first access point having a low security level, thereby preventing the authentication data from being stolen and improving a security level of the network.

Figure 7:
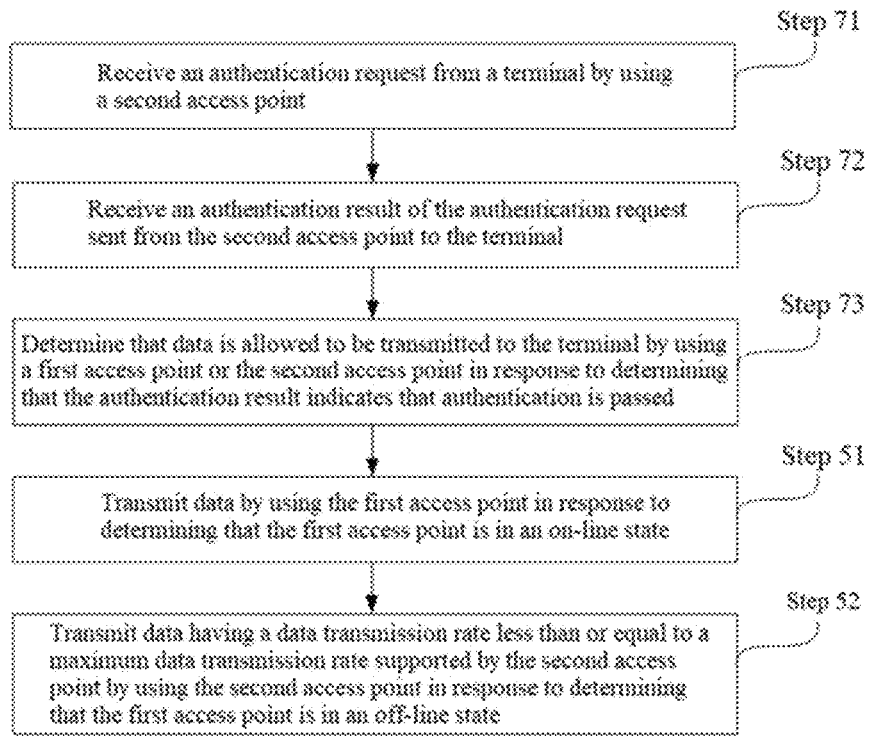
FIG. 7 is a schematic diagram of a method for transmitting data provided in another example of the disclosure.

As shown in FIG. 7, another example of the disclosure provides a method for transmitting data. When the method is used in a server, the method further includes:

Step 71, an authentication request is received from a terminal by using a second access point.

In an example, the authentication request may include authentication information for authenticating an identity of the terminal. The authentication request may be a request to establish a wireless connection with the first access point and/or the second access point.

In an example, the server may have both a terminal authentication function and a data processing function. For example, the server may authenticate the terminal and may forward and process data transmitted from the terminal. For example, in a smart home system, running data sent from a sweeping robot may be stored in the server, and a mobile phone may obtain the running data from the server.

Step 72, an authentication result of the authentication request sent from the second access point to the terminal is received.

Connection security of the second access point is higher than that of the first access point.

In an example, when the server determines that the terminal is a legitimate user device, the authentication result includes information allowing the terminal to access a network by using the first access point and/or the second access point.

In another example, when the server determines that the terminal is an illegitimate user device, the authentication result includes information prohibiting the terminal from accessing the network by using the first access point and the second access point.

In an example, with higher connection security, data transmitted on a connection is unlikely to be stolen, data is transmitted on the basis of a data security level during connection, and the data transmitted on the connection is encrypted through high-order encryption.

Step 73, data is determined to be allowed to be transmitted to the terminal by using the first access point or the second access point in response to determining that the authentication result indicates that authentication is passed.

In an example, data is determined to be prohibited from being transmitted to the terminal by using the first access point or the second access point in response to determining that the authentication result indicates that authentication is not passed.

In the example, authentication data having a high security level is transmitted by using the second access point having higher connection security, and common data may be transmitted by using the first access point having a low security level, thereby preventing the authentication data from being stolen and improving a security level of the network.

Figure 8:
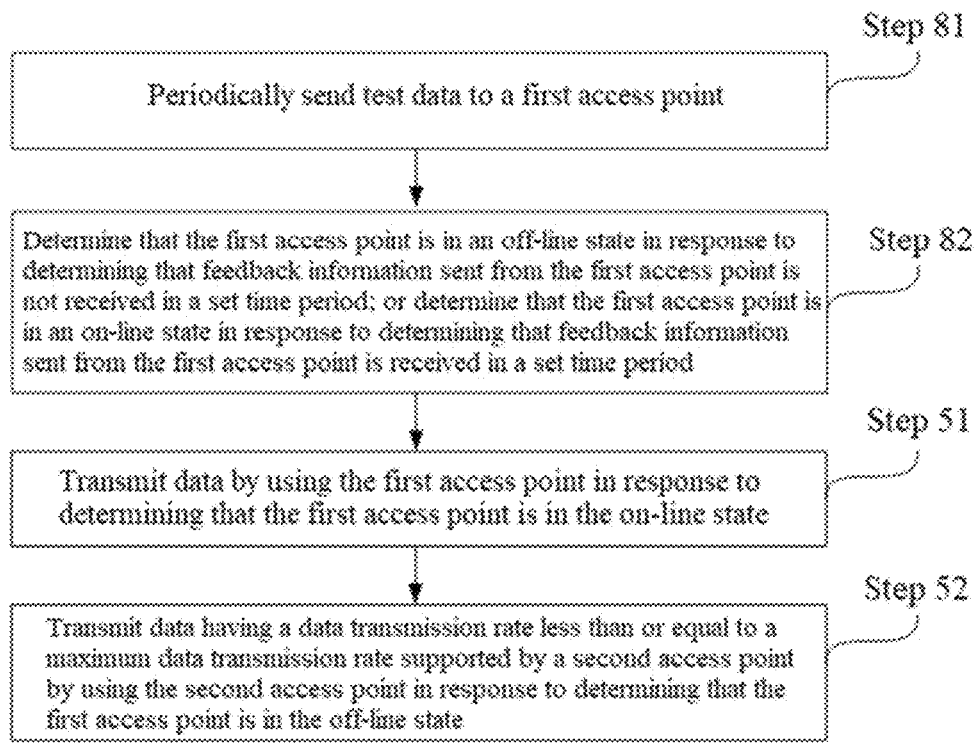
FIG. 8 is a schematic diagram of a method for transmitting data provided in another example of the disclosure.

As shown in FIG. 8, another example of the disclosure provides a method for transmitting data. When the method is used in a terminal, the method further includes:

Step 81, test data is periodically sent to a first access point.

In an example, as long as test data sent from the terminal is received, the first access point may reply feedback information to the terminal. If the terminal does not receive the feedback information after sending the test data, the first access point may be determined to be in an off-line state.

In an example, the test data is a heartbeat packet.

In an example, when the terminal needs to transmit data to a network, the test data may be periodically sent to the first access point.

In another example, when the terminal enters a signal coverage range of the first access point, the test data may be periodically sent to the first access point.

In an example, a period of sending the test data may be set according to frequency of sending data of the terminal by using the first access point.

In an example, when the frequency of sending data of the terminal by using the first access point is less than a first frequency threshold, the period of sending the test data is set to be greater than a second time threshold; and when the frequency of sending data of the terminal by using the first access point is greater than a third frequency threshold, the period of sending the test data is set to be less than a fourth time threshold.

Step 82, the first access point is determined to be in the off-line state in response to determining that feedback information sent from the first access point is not received in a set time period;

alternatively, the first access point is determined to be in an on-line state in response to determining that feedback information sent from the first access point is received in a set time period.

In an example, the set time period may be determined according to a network delay requirement.

In an example, when the network delay requirement is less than a first delay threshold, the set time period is determined to be less than a first value; and when the network delay requirement is greater than a second delay threshold, set time is determined to be greater than a second value.

With a small set time period set, once the feedback information sent from the first access point is not received in the set time period, the first access point may be rapidly determined to be in the off-line state, and the second access point in the on-line state may be used to transmit data in time, thereby shortening interruption time of data transmission and reducing a response delay of a system network.

The feedback information may be information fed back for the test data sent from the terminal.

Figure 9:
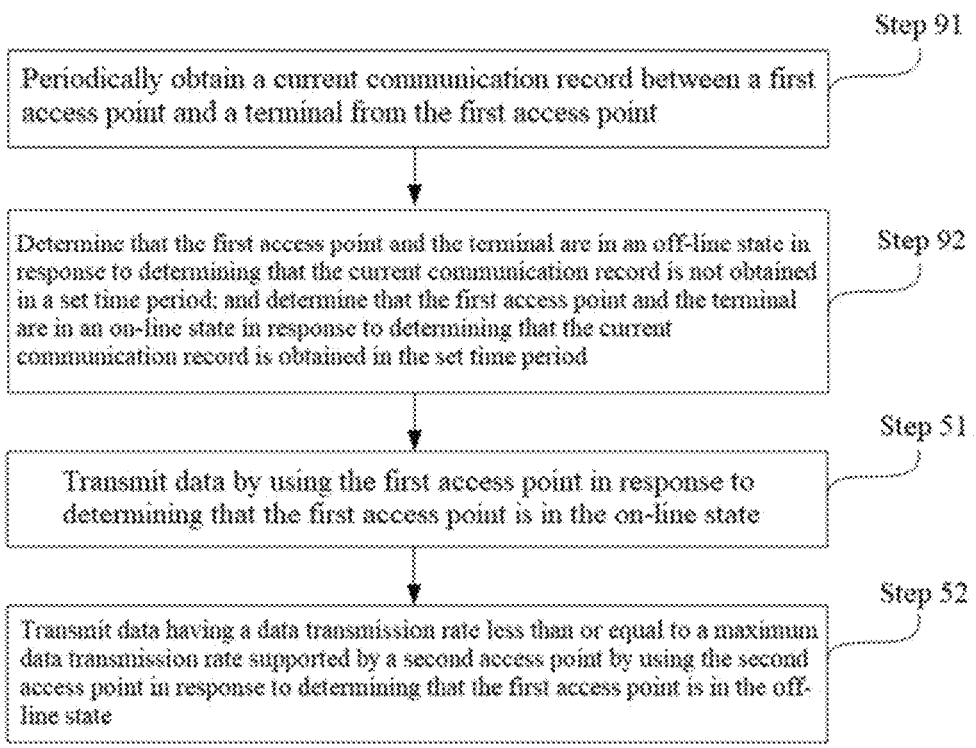
FIG. 9 is a schematic diagram of a method for transmitting data provided in another example of the disclosure.

As shown in FIG. 9, another example of the disclosure provides a method for transmitting data. When the method is used in a server, the method further includes:

Step 91, a current communication record between a first access point and a terminal is periodically obtained from the first access point.

In an example, during communication between the first access point and the terminal, a communication record may be saved and periodically updated. The current communication record may be a communication record of the last update. In an example, as long as a wireless connection is established between the terminal and the first access point, a communication process may be recorded periodically, and the communication record may be generated periodically.

In an example, when the server needs to transmit data to the terminal, the current communication record between the first access point and the terminal may be periodically obtained from the first access point.

In an example, a period of sending test data may be set according to frequency of sending data of the server by using the first access point.

In an example, when the frequency of sending data of the server by using the first access point is less than a first frequency threshold, the period of sending the test data is set to be greater than a first time threshold; and when the frequency of sending data of the server by using the first access point is greater than a second frequency threshold, the period of sending the test data is set to be less than a second time threshold.

Step 92, the first access point and the terminal are determined to be in an off-line state in response to determining that the current communication record is not obtained in a set time period;

alternatively, the first access point and the terminal are determined to be in an on-line state in response to determining that the current communication record is obtained in the set time period.

In an example, the set time period may be determined according to a network delay requirement.

In an example, when the network delay requirement is less than a first delay threshold, the set time period is determined to be less than a first value; and when the network delay requirement is greater than a second delay threshold, set time is determined to be greater than a second value. The first value is less than the second value.

With a small set time period set, once the current communication record is not obtained in the set time period, the first access point may be rapidly determined to be in the off-line state, and the second access point in the on-line state may be used to transmit data in time, thereby shortening interruption time of data transmission and reducing a response delay of a system network.

In an example, connection stability of the second access point is higher than that of the first access point.

In an example, with high connection stability, after the terminal accesses a network, frequency of changing from the on-line state to the off-line state per unit time due to network reasons is lower than a set frequency threshold.

To facilitate understanding of the technical solution of the disclosure, the solution of the disclosure is further described through Example 1 as follows.

Example 1

Figure 10:
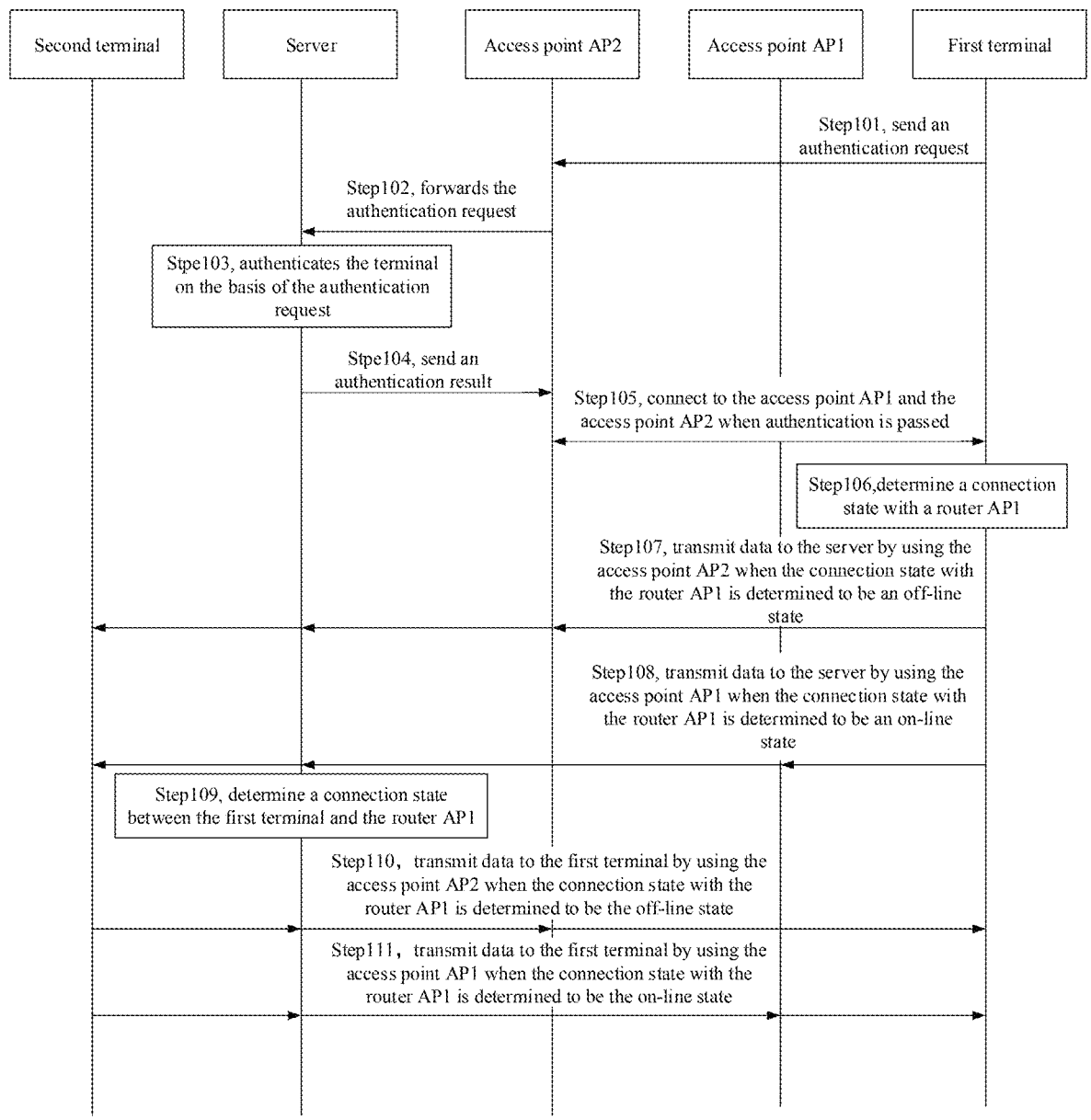
FIG. 10 is a schematic diagram of a method for transmitting data provided in another example of the disclosure.

With reference to FIG. 10, in the example, a system includes a first terminal, a second terminal, a server, an access point AP1, and an access point AP2. The method includes:

Step 101, the first terminal sends an authentication request to the access point AP2.

Step 102, the first terminal forwards the authentication request to the server.

Step 103, the server authenticates the first terminal on the basis of the authentication request.

Step 104, the server sends an authentication result to the access point AP2.

Step 105, when authentication is passed, the first terminal is connected to the access point AP1 and the access point AP2.

Step 106, the first terminal determines a connection state with a router AP1.

Step 107, when the connection state with the router AP1 is determined to be an off-line state, the first terminal transmits data to the server by using the access point AP2. Transmitted data is control signal data having a data transmission rate less than a set threshold.

Step 108, when the connection state with the router AP1 is determined to be an on-line state, the first terminal transmits data to the server by using the access point AP1.

Step 109, the server determines a connection state between the first terminal and the router AP1.

Step 110, when the connection state with the router AP1 is determined to be the off-line state, the server transmits data to the first terminal by using the access point AP2.

Step 111, when the connection state with the router AP1 is determined to be the on-line state, the server transmits data to the first terminal by using the access point AP1.

In the example, when a first access point AP1 is in a connected state, a user transmits data by using the first access point AP1. When the first access point AP1 is in the off-line state, the user may further transmit data having a data transmission rate less than a maximum data transmission rate supported by a second access point AP2 by using the second access point AP2, such that connection stability of a network is higher, transmission of the data having the data transmission rate less than the maximum data transmission rate supported by the second access point AP2 cannot be interrupted due to the fact that the first access point AP1 is in the off-line state, and poor experiences brought to the user by communication interruption when the first access point AP1 is in the off-line state may be reduced.

Figure 11:
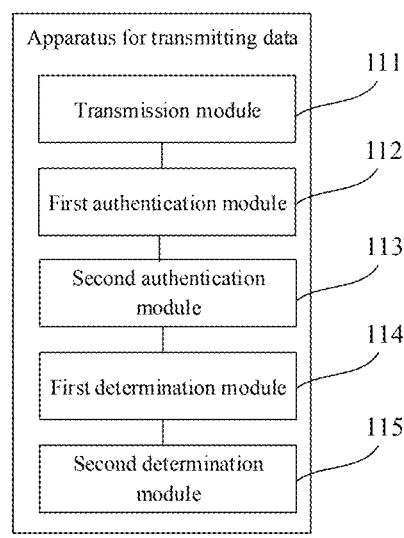
FIG. 11 is a schematic diagram of an apparatus for transmitting data provided in another example of the disclosure.

As shown in FIG. 11, an example of the disclosure provides an apparatus for transmitting data. The apparatus includes a transmission module 111.

The transmission module 111 is configured to: transmit data by using a first access point in response to determining that the first access point is in an on-line state; and transmit data by using a second access point in response to determining that the first access point is in an off-line state. A maximum data transmission rate supported by the second access point is less than that supported by the first access point.

In an example, the transmission module 111 is further configured to: transmit data having a data transmission rate less than or equal to the maximum data transmission rate supported by the second access point by using the second access point in response to determining that the first access point is in the off-line state.

In an example, when the apparatus is used in a terminal, the apparatus further includes a first authentication module 112.

The first authentication module 112 is configured to: send an authentication request to a server by using the second access point; receive an authentication result that is forwarded by the second access point and returned by the server based on the authentication request, where connection security of the second access point is higher than that of the first access point; and determine that data is allowed to be transmitted to the server by using the first access point or the second access point in response to determining that the authentication result indicates that authentication is passed.

In an example, when the apparatus is used in a server, the apparatus further includes a second authentication module 113.

The second authentication module 113 is configured to: receive an authentication request from a terminal by using the second access point; receive an authentication result of the authentication request sent from the second access point to the terminal, where connection security of the second access point is higher than that of the first access point; and determine that data is allowed to be transmitted to the terminal by using the first access point or the second access point in response to determining that the authentication result indicates that authentication is passed.

In an example, when the apparatus is used in a terminal, the apparatus further includes a first determination module 114.

The first determination module 114 is configured to: periodically send test data to the first access point; determine that the first access point is in the off-line state in response to determining that feedback information sent from the first access point is not received in a set time period; or determine that the first access point is in the on-line state in response to determining that feedback information sent from the first access point is received in a set time period.

In an example, the first determination module 114 is further configured to use a heartbeat packet as the test data.

In an example, when the apparatus is used in a server, the apparatus further includes a second determination module 115.

The second determination module 115 is configured to: periodically obtain a current communication record between the first access point and the terminal from the first access point; determine that the first access point and the terminal are in the off-line state in response to determining that the current communication record is not obtained in a set time period; and determine that the first access point and the terminal are in the on-line state in response to determining that the current communication record is obtained in the set time period.

In an example, the transmission module 111 is further configured to: make connection stability of the second access point higher than that of the first access point.

An example of the disclosure further provides a communication device. The communication device includes:
an antenna;
a memory; and
a processor that is connected to the antenna and the memory separately and configured to control the antenna to receive and transmit wireless signals by executing an executable program stored in the memory, and is capable of implementing the steps of a method for accessing a wireless network provided in any one of the examples.

The communication device provided in the example may be the above-mentioned terminal or base station. The terminal may be various user terminals or vehicular terminals. The base stations may be various types of base stations, such as a 4th generation mobile communication technology (4G) base station or a 5th generation mobile communication technology (5G) base station.

The antennas may be various types of antennas, such as a 3rd generation mobile communication technology (3G) antenna, a 4G antenna or a 5G antenna. The antenna may further include: a WiFi antenna or a wireless charging antenna.

The memory may include various types of storage media, which are non-temporary computer storage media, and may continue to store information stored in the communication device after the communication device is powered off.

The processor may be connected to the antenna and the memory by means of a bus, etc., and is used to read an executable program stored in the memory, for example, through at least one of the methods shown in any one of the examples of the disclosure.

An example of the disclosure further provides a non-temporary computer-readable storage medium, which stores an executable program. The executable program implements the steps of a method for accessing a wireless network provided in any one of the examples when being executed by a processor, for example, through at least one of the methods shown in any one of the examples of the disclosure.

Figure 12:
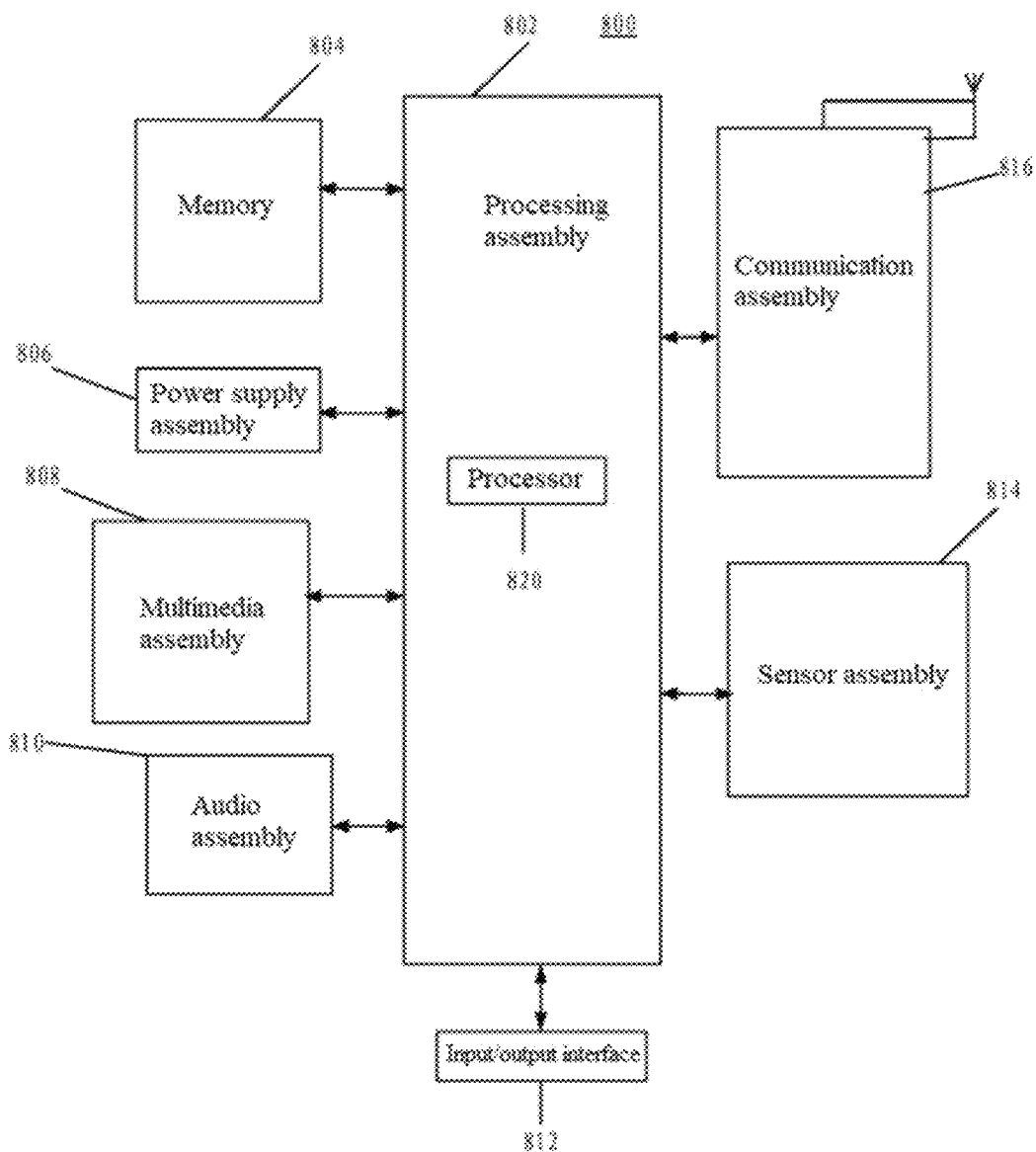
FIG. 12 is a structural schematic diagram of a terminal provided in an example of the disclosure.

As shown in FIG. 12, an example of the disclosure provides a structure of a terminal.

FIG. 12 shows a terminal 800. The example provides the example 800. The terminal may specifically be a mobile phone, a computer, a digital broadcast terminal, a messaging device, a game console, a tablet device, a medical device, a fitness device, a personal digital assistant, etc.

With reference to FIG. 12, the terminal 800 may include one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls all operations of the terminal 800, such as operations associated with display, telephone call, data communication, camera operation and recording operations. The processing assembly 802 may include one or more processors 820 for executing an instruction, so as to complete all or part of the steps of the method. In addition, the processing assembly 802 may include one or more modules to facilitate interactions between the processing assembly 802 and other assemblies. For example, the processing assembly 802 may include a multimedia module to facilitate an interaction between the multimedia assembly 808 and the processing assembly 802.

The memory 804 is configured to store various types of data to support the operations on the device 800. Examples of the data include an instruction for any application or method operating on the terminal 800, contact data, phone book data, a message, a picture, a video, etc. The memory 804 may be implemented by any type of volatile or non-volatile memory device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power supply assembly 806 supplies power to various assemblies of the terminal 800. The power supply assembly 806 may include a power management system, one or more power supplies, and other assemblies associated with generating, managing and distributing power for the terminal 800.

The multimedia assembly 808 includes a screen that provides an output interface between the terminal 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touching, sliding and gestures on the touch panel. The touch sensor may sense a boundary of a touching or sliding operation, and further measure a duration and pressure related to the touching or sliding operation. In some examples, the multimedia assembly 808 includes a front camera and/or a back camera. When the device 800 is in an operation mode, such as a shooting mode or a video mode, the front camera and/or the back camera are/is capable of receiving external multimedia data. Each of the front camera and back camera may be a fixed optical lens system or have a focal length and optical zoom capability.

The audio assembly 810 is configured to output and/or input an audio signal. For example, the audio assembly 810 includes a microphone (MIC). The microphone is configured to receive an external audio signal when the terminal 800 is in operation modes such as a call mode, a recording mode and a voice identification mode. The received audio signal may be further stored in the memory 804 or sent via the communication assembly 816. In some examples, the audio assembly 810 further includes a speaker for outputting an audio signal.

The I/O interface 812 provides an interface between the processing assembly 802 and a peripheral interface module. The peripheral interface module may be a keyboard, a click wheel, a button, etc. The buttons may include, but are not limited to, a home button, a volume button, a start button and a lock button.

The sensor assembly 814 includes one or more sensors for providing various aspects of state assessment for the terminal 800. For example, the sensor assembly 814 is capable of detecting an on/off state of the device 800 and relative positioning of the assemblies, such as a display and a keypad of the terminal 800, and the sensor assembly 814 is further capable of detecting position change of the terminal 800 or an assembly of the terminal 800, presence or absence of contact between the user and the terminal 800, an orientation or acceleration/deceleration of the terminal 800, and temperature change of the terminal 800. The sensor assembly 814 may include a proximity sensor configured to detect presence of a nearby object without any physical contact. The sensor assembly 814 may further include an optical sensor, such as a complementary metal-oxide-semiconductor (CMOS) or charge-coupled device (CCD) image sensor, which is used in imaging applications. In some examples, the sensor assembly 814 may further include an acceleration sensor, a gyroscope sensor, a magnetic sensor, a pressure sensor or a temperature sensor.

The communication assembly 816 is configured to facilitate wired or wireless communication between the terminal 800 and other devices. The terminal 800 may access a wireless network based on a communication standard, such as WiFi, the 2nd generation mobile communication technology (2G) or 3G, or their combination. In an example, the communication assembly 816 receives a broadcast signal or broadcast related information from an external broadcast management system via a broadcast channel. In an example, the communication assembly 816 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology or other technologies.

In an example, the terminal 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components, thus executing the method.

In the examples, there is further provided a non-transitory computer-readable storage medium including an instruction, such as the memory 804 including an instruction. The instruction may be executed by the processor 820 of the terminal 800 so as to complete the above-mentioned method. For example, the non-transitory computer-readable storage medium may be ROM, RAM, CD-ROM, a magnetic tape, a floppy disk, an optical data storage device, etc.

The terminal may be used to implement the methods, such as the method of any one of the examples of the disclosure.

Figure 13:
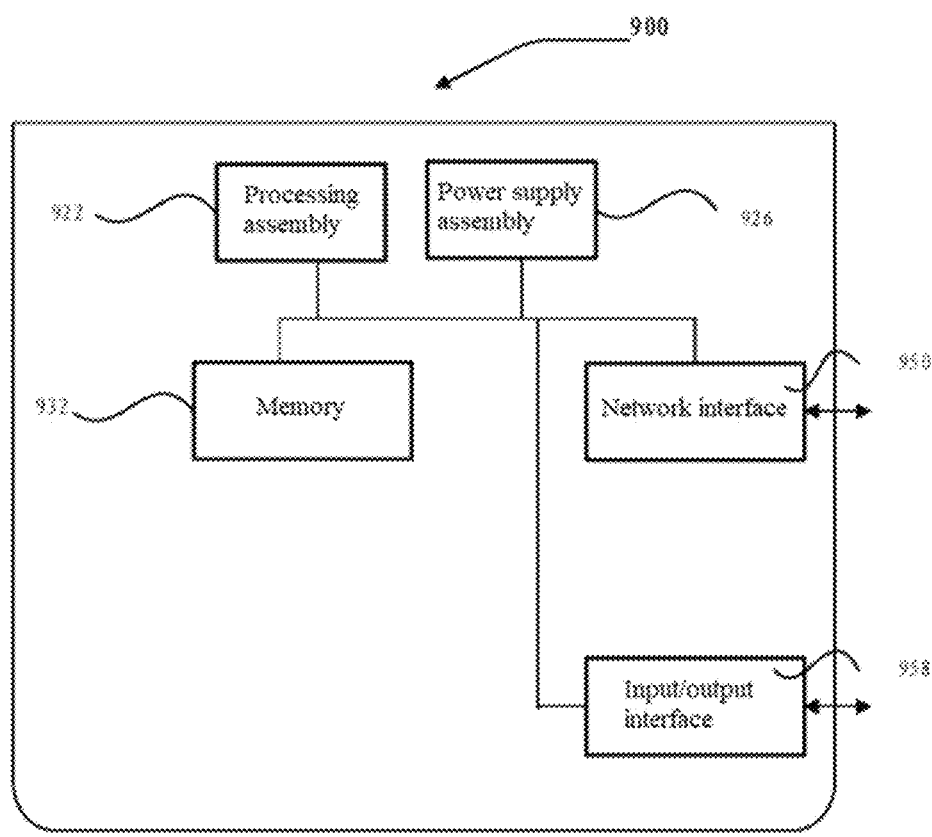
FIG. 13 is a structural schematic diagram of a base station provided in an example of the disclosure.

As shown in FIG. 13, an example of the disclosure provides a structure of a base station. For example, a network-side device may be used as the base station 900. With reference to FIG. 13, the base station 900 includes a processing assembly 922, which further includes one or more processors, and a memory resource represented by a memory 932, which is configured to store instructions executable by the processing assembly 922, such as applications. The applications stored in the memory 932 may include one or more modules that each corresponds to a group of instructions. In addition, the processing assembly 922 is configured to execute instructions, so as to execute any of the methods, such as the method of any one of the examples of the disclosure.

The base station 900 may further include a power supply assembly 926 configured to conduct power management of the base station 900, a wired or wireless network interface 950 configured to connect the base station 900 to a network, and an I/O interface 958. The base station 900 may operate based on an operating system stored in the memory 932, such as Windows Server™, Mac OS X™, Unix™, Linux™ or FreeBSD™.

The wireless network interface 950 includes, but is not limited to, the antenna of the communication device. Those skilled in the art could easily conceive of other implementation solutions of the present disclosure upon consideration of the description and the disclosure disclosed herein. The present disclosure is intended to cover any variations, uses or adaptive changes of the present disclosure, which follow the general principles of the present disclosure and include common general knowledge or conventional technical means, which is not disclosed in the disclosure, in the art. The specification and the examples are to be regarded as exemplary only, and the true scope and spirit of the present disclosure are indicated by the following claims.

It should be understood that the present disclosure is not limited to a precise structure which has been described above and illustrated in the accompanying drawings, and can have various modifications and changes without departing from the its scope. The scope of the present disclosure is limited by the appended claims only.

The invention claimed is:

1. A method for transmitting data, comprising:
   transmitting data by using a first access point in response to determining that the first access point is in an on-line state, wherein a terminal is configured to send an authentication request to a server through a second access point to establish a connection with the first access point in response to the terminal entering a signal coverage range of the first access point; and
   transmitting data by using a second access point in response to determining that the first access point is in an off-line state,
   wherein a maximum data transmission rate supported by the second access point is less than that supported by the first access point, and
   wherein when the method is used in a server, the method further comprises:
   receiving an authentication request from a terminal by using the second access point;
   receiving an authentication result of the authentication request sent from the second access point to the terminal, wherein connection security of the second access point is higher than that of the first access point; and
   determining that data is allowed to be transmitted to the terminal by using the first access point or the second access point in response to determining that the authentication result indicates that authentication is passed.

2. The method according to claim 1, wherein the transmitting data by using the second access point in response to determining that the first access point is in an off-line state comprises:
   transmitting data having a data transmission rate less than or equal to the maximum data transmission rate supported by the second access point by using the second access point in response to determining that the first access point is in the off-line state.

3. The method according to claim 1, wherein when the method is used in a terminal, the method further comprises:
   sending an authentication request to a server by using the second access point;
   receiving an authentication result that is forwarded by the second access point and returned by the server based on the authentication request, wherein connection security of the second access point is higher than that of the first access point; and determining that data is allowed to be transmitted to the server by using the first access point or the second access point in response to determining that the authentication result indicates that authentication is passed.

4. The method according to claim 1, wherein when the method is used in a terminal, the method further comprises:
periodically sending test data to the first access point; and
determining that the first access point is in the off-line state in response to determining that feedback information sent from the first access point is not received in a set time period;
alternatively,
determining that the first access point is in the on-line state in response to determining that feedback information sent from the first access point is received in a set time period.

5. The method according to claim 4, wherein the test data is a heartbeat packet.

6. The method according to claim 1, wherein when the method is used in a server, the method further comprises:
periodically obtaining a current communication record between the first access point and a terminal from the first access point;
determining that the first access point and the terminal are in the off-line state in response to determining that the current communication record is not obtained in a set time period; and
determining that the first access point and the terminal are in the on-line state in response to determining that the current communication record is obtained in the set time period.

7. The method according to claim 1, wherein connection stability of the second access point is higher than that of the first access point.

8. A communication device, comprising:
an antenna;
a memory; and
a processor that is connected to the antenna and the memory separately and configured to control transmission and reception of the antenna by executing a computer executable instruction stored in the memory to:
transmit data by using a first access point in response to determining that the first access point is in an on-line state, wherein a terminal is configured to send an authentication request to a server through a second access point to establish a connection with the first access point in response to the terminal entering a signal coverage range of the first access point; and
transmit data by using a second access point in response to determining that the first access point is in an off-line state,
wherein a maximum data transmission rate supported by the second access point is less than that supported by the first access point, and
wherein when the communication device is used in a server, the processor is further configured to:
receive an authentication request from a terminal by using the second access point;
receive an authentication result of the authentication request sent from the second access point to the terminal, wherein connection security of the second access point is higher than that of the first access point; and
determine that data is allowed to be transmitted to the terminal by using the first access point or the second access point in response to determining that the authentication result indicates that authentication is passed.

9. The communication device according to claim 8, wherein the processor is further configured to:
transmit data having a data transmission rate less than or equal to the maximum data transmission rate supported by the second access point by using the second access point in response to determining that the first access point is in the off-line state.

10. The communication device according to claim 8, wherein when the communication device is used in a terminal, the processor is further configured to:
send an authentication request to a server by using the second access point;
receive an authentication result that is forwarded by the second access point and returned by the server based on the authentication request, wherein connection security of the second access point is higher than that of the first access point; and
determine that data is allowed to be transmitted to the server by using the first access point or the second access point in response to determining that the authentication result indicates that authentication is passed.

11. The communication device according to claim 8, wherein when the communication device is used in a terminal, the processor is further configured to:
periodically send test data to the first access point; and
determine that the first access point is in the off-line state in response to determining that feedback information sent from the first access point is not received in a set time period;
alternatively,
determine that the first access point is in the on-line state in response to determining that feedback information sent from the first access point is received in a set time period.

12. The communication device according to claim 11, wherein the test data is a heartbeat packet.

13. The communication device according to claim 8, wherein when the communication device is used in a server, the processor is further configured to:
periodically obtain a current communication record between the first access point and a terminal from the first access point;
determine that the first access point and a terminal are in the off-line state in response to determining that the current communication record is not obtained in a set time period; and
determine that the first access point and the terminal are in the on-line state in response to determining that the current communication record is obtained in the set time period.

14. The communication device according to claim 8, wherein connection stability of the second access point is higher than that of the first access point.

15. A non-transitory computer-readable storage medium, storing a computer executable instruction, wherein the computer executable instruction is capable of implementing a method comprising:
transmitting data by using a first access point in response to determining that the first access point is in an on-line state, wherein a terminal is configured to send an authentication request to a server through a second access point to establish a connection with the first access point in response to the terminal entering a signal coverage range of the first access point; and
transmitting data by using a second access point in response to determining that the first access point is in an off-line state, wherein a maximum data transmission rate supported by the second access point is less than that supported by the first access point, and wherein when the non-transitory computer-readable storage medium is used in a server, the method further comprises:

receiving an authentication request from a terminal by using the second access point;

receiving an authentication result of the authentication request sent from the second access point to the terminal, wherein connection security of the second access point is higher than that of the first access point; and determining that data is allowed to be transmitted to the terminal by using the first access point or the second access point in response to determining that the authentication result indicates that authentication is passed.

16. The non-transitory computer-readable storage medium according to claim 15, wherein the transmitting data by using the second access point in response to determining that the first access point is in an off-line state comprises:

transmitting data having a data transmission rate less than or equal to the maximum data transmission rate supported by the second access point by using the second access point in response to determining that the first access point is in the off-line state.

17. The non-transitory computer-readable storage medium according to claim 15, wherein when the non-transitory computer-readable storage medium is used in a terminal, the method further comprises:

sending an authentication request to a server by using the second access point;

receiving an authentication result that is forwarded by the second access point and returned by the server based on the authentication request, wherein connection security of the second access point is higher than that of the first access point; and determining that data is allowed to be transmitted to the server by using the first access point or the second access point in response to determining that the authentication result indicates that authentication is passed.

* * * * *